US010725838B2

(12) United States Patent
Fransazov et al.

(10) Patent No.: US 10,725,838 B2
(45) Date of Patent: Jul. 28, 2020

(54) APPLICATION STARTUP CONTROL (71) Applicant: Microsoft Technology Licensing, LLC, Redmond, WA (US)

(72) Inventors: Mariyan Fransazov, Kirkland, WA (US); Hemanth Kumar, Bellevue, WA (US); Radu Bogdan Gruian, Sammamish, WA (US); Michael Hideaki Yamamoto, Sammamish, WA (US); Muralidhar Sathsahayaraman, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 309 days.

(21) Appl. No.: 15/473,404

(22) Filed: Mar. 29, 2017

(65) Prior Publication Data

US 2018/0285173 A1 Oct. 4, 2018

(51) Int. Cl.
*G06F 9/54* (2006.01)
*G06F 8/74* (2018.01)
*G06F 8/41* (2018.01)
*G06F 9/445* (2018.01)

(52) U.S. Cl.
CPC ............... *G06F 9/546* (2013.01); *G06F 8/41* (2013.01); *G06F 8/433* (2013.01); *G06F 8/74* (2013.01); *G06F 9/44521* (2013.01)

(58) Field of Classification Search
None
See application file for complete search history.

(56) References Cited

U.S. PATENT DOCUMENTS

| 7,152,229 B2 | 12/2006 | Chong et al. |
| 7,584,462 B2 | 9/2009 | Wolff et al. |
| 9,282,145 B2 | 3/2016 | Wei et al. |
| 9,286,042 B2 | 3/2016 | Gounares et al. |
| 2005/0183076 A1* | 8/2005 | Colangelo ............... G06F 9/453 717/147 |
| 2006/0075394 A1* | 4/2006 | Iwamoto ............. G06F 9/44521 717/162 |
| 2006/0194181 A1* | 8/2006 | Rosenberg ............... G09B 5/06 434/317 |
| 2011/0320426 A1* | 12/2011 | Dutta ..................... G06F 16/958 707/709 |
| 2014/0164892 A1* | 6/2014 | Nickolov .............. G06F 3/0483 715/205 |

(Continued)

OTHER PUBLICATIONS

"Best practices for your app's startup performance", https://docs.microsoft.com/en-us/windows/uwp/debug-test-perf/best-practices-for-your-app-s-startup-performance, Retrieved on: Feb. 14, 2017, 15 pages.

(Continued)

*Primary Examiner* — Chat C Do
*Assistant Examiner* — William C Wood
(74) *Attorney, Agent, or Firm* — Mannava & Kang, P.C.

(57) ABSTRACT

In some examples, application startup control may include determining a relationship between a first page and a second page of an application, and generating a first code file for the first page based upon the determined relationship. Application startup control may further include generating a second code file for the second page. The first code file may include code to load the second code file in response to the first code file being loaded and executed.

20 Claims, 7 Drawing Sheets

(56) References Cited

U.S. PATENT DOCUMENTS

2014/0359572 A1\* 12/2014 Yuen ........................ G06F 8/33
717/111
2016/0156732 A1   6/2016 Chen et al.
2016/0188304 A1\* 6/2016 Abadi ................. G06F 9/45529
717/157

OTHER PUBLICATIONS

"Code Splitting", https://webpack.github.io/docs/code-splitting.html, Retrieved on: Feb. 14, 2017, 12 pages.
Bidelman, Eric, "Fast Polymer app loading—optimized for first render, progressively enhanced lazy loading", https://gist.github.com/ebidel/1ba71473d687d0567bd3, Retrieved on: Feb. 14, 2017, 6 pages.
Lepage, Pete, "Your First Progressive Web App", https://developers.google.com/web/fundamentals/getting-started/codelabs/your-first-pwapp/, Published on: Feb. 16, 2017, 38 pages.
"Dependency Manager", https://docs.appery.io/docs/appbuilder-ionic-dependency-manager, Retrieved on: Feb. 14, 2017, 4 pages.
Jennmar, "Visual Studio 2010: How to understand your code using Dependency Graphs, Sequence Diagrams, and the Architecture Explorer", https://blogs.msdn.microsoft.com/jennifer/2010/05/11/visual-studio-2010-how-to-understand-your-code-using-dependency-graphs-sequence-diagrams-and-the-architecture-explorer/, Published on: May 11, 2010, 49 pages.

\* cited by examiner

```
┌─────────────────────────────────────────────────────────────────┐
│ DETERMINE, BASED ON PARENTING INFORMATION THAT IDENTIFIES A     │
│    PLURALITY OF PAGES OF AN APPLICATION, A FIRST PAGE OF THE    │
│                       PLURALITY OF PAGES                        │
│                              602                                │
└─────────────────────────────────────────────────────────────────┘
                                │
                                ▼
┌─────────────────────────────────────────────────────────────────┐
│    DETERMINE, BASED ON THE PARENTING INFORMATION, AN            │
│  ASSOCIATION BETWEEN THE FIRST PAGE AND A SECOND PAGE OF        │
│                  THE PLURALITY OF PAGES                         │
│                              604                                │
└─────────────────────────────────────────────────────────────────┘
                                │
                                ▼
┌─────────────────────────────────────────────────────────────────┐
│     GENERATE A RESPECTIVE CODE FILE FOR EACH OF THE             │
│                    PLURALITY OF PAGES                           │
│                              606                                │
└─────────────────────────────────────────────────────────────────┘
```

APPLICATION STARTUP CONTROL

BACKGROUND

An application may be described as a computer program that is designed to perform a specified task, or a group of coordinated functions. Applications may include, for example, a web browser, a console game, an image editor, a word processor, etc. An application may be downloaded or otherwise accessed by a computerized device, such as, a personal computer, a tablet, a smartphone, etc.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Application startup control apparatuses, methods for application startup control, and non-transitory computer readable media having stored thereon machine readable instructions to provide application startup control are disclosed herein. The apparatuses, methods, and non-transitory computer readable media disclosed herein provide for segmentation of application code for an application in accordance with pages of the application to reduce memory utilization associated with operation of the application, as well as startup time associated with startup of the application.

With respect to applications that may include several pages, application performance with respect to the initial startup time may be negatively affected by the need to load the entire application into memory. For example, declarative documents may provide for application creation through code generation. While the generated code may be operational, the generated code may nevertheless need the entire application to be loaded into memory for correct functionality. However, loading of the entire application into memory may result in technical challenges with respect to increased load on the memory. Further, loading of the entire application into memory may result in technical challenges with respect to delays associated with application startup as the application is being loaded into the memory before startup.

In order to address at least these technical challenges with respect to increased memory load and application startup performance, the apparatuses, methods, and non-transitory computer readable media disclosed herein may provide for logical segmentation of application code for an application in accordance with pages of the application. The pages of the application may be represented by different files (hereinafter designated "code files") which may include appropriate portions of the segmented application code. The code files may be loaded and accessed as needed during startup of the application, as well as during operation of the application after completion of startup.

The code file for a specific page may be determined by identifying elements that are specific to the page. An element for a page may include, for example, controls and data sources used on the page. Controls may be described as elements that may be actuated to perform a particular action specified by the control. Examples of controls include elements for uploading images from a data source, playing an audio clip, scanning a barcode, etc. With respect to data sources, data flow for an application may be represented as a data flow graph. For a data flow graph of an application, data sources may include proxies for data that is external to the application.

The code file for a specific page may also include entry points that specify on demand loading of a requested page. An entry point may be described as an action that provides for navigation from one page to another page that is specified by that entry point.

The code file for a specific page may further include dependencies between different pages of the application. For example, a dependency between two pages of the application may specify that a second page is to be loaded for correct functionality of the first page (i.e., the first page is dependent on the second page).

With respect to generation of the code files, parenting information may be maintained for each control (also designated as a user interface (UI) element) to identify the page on which the control is located. The parenting information may be described as a page associated with a control.

The apparatuses, methods, and non-transitory computer readable media disclosed herein thus provide at least for the reduction in memory load with respect to operation of an application, as well as the reduction in initial startup time with respect to application startup performance. Segmentation of the application code as disclosed herein also provides for pages of an application to be isolated, shared, and/or composed as needed. For example, an application for an organization may include a common login page, which is shared among different application developers. Updating of the common login page may be performed by replacing the code file for an older version of the common login page with a newer version of a code file. In this manner, instead of the entire application code being updated, the code file associated with the common login page may be updated. According to another example, a marketplace of pages may be provided, where users may select from a gallery of pages and create applications by composing the pages, and creating and potentially sharing intermediate pages as needed.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

Figure 1:
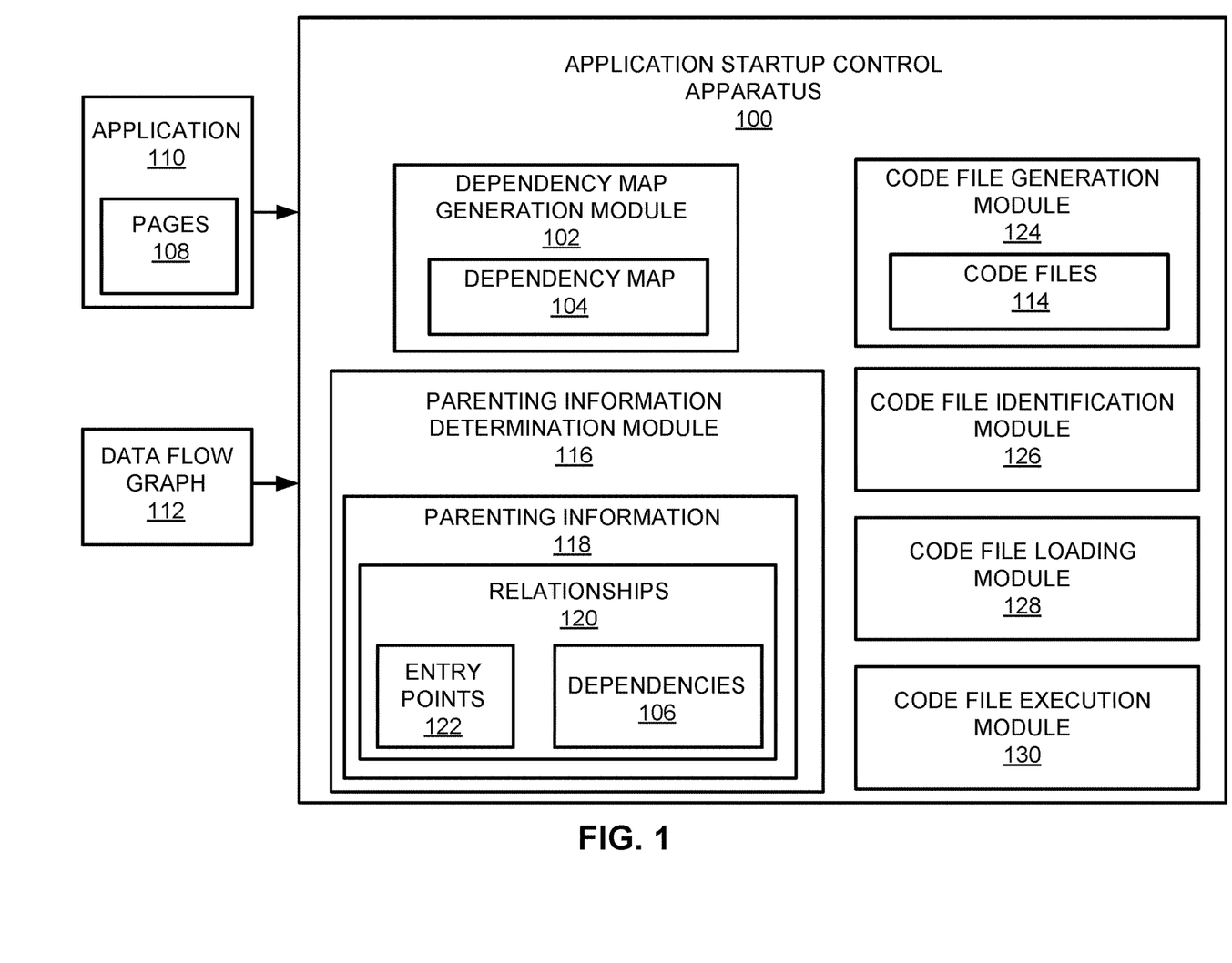
FIG. 1 illustrates a layout of an application startup control apparatus in accordance with an embodiment of the present disclosure.

FIG. 1 illustrates a layout of an application startup control apparatus (hereinafter also referred to as "apparatus 100") according to an embodiment of the present disclosure.

Referring to FIG. 1, the apparatus 100 may include a dependency map generation module 102 to generate a dependency map 104 to identify dependencies 106 between pages 108 of an application 110. The dependency map 104 may be derived from a data flow graph 112 for the application 110. With respect to the data flow graph 112, as disclosed herein, declarative documents may provide for application creation through code generation. In this regard, the generated code for the application 110 may represent the application code, which is segmented to generate code files 114 as disclosed herein. The code files 114 may represent logical partitions of the data flow graph 112 (i.e., subgraphs), and account for the operational logic associated with different pages 108 of the application 110. According to an example, the application code may be generated as a JAVASCRIPT™ file or files based on other types of languages, and the code files 114 may be generated as JAVASCRIPT™ files or files based on other types of languages. The data flow graph 112 may include elements that are organized in a hierarchical manner, with the pages 108 of the application 110 being located at the top of the hierarchy. The data flow graph 112 may include nodes that represent controls, and input and output properties of the controls, and edges between the nodes. In this regard, the dependency map generation module 102 may generate the dependency map 104 based on the edges between the nodes. Thus, the dependency map 104 may provide dependency information with respect to controls and their properties. The dependency map 104 may be analyzed to determine which of the pages 108, and thus which of the code files 114 that are respectively associated with the pages 108, are to be loaded, for example, for startup control of the application 110.

Each page of the plurality of pages 108 of the application 110 may be designated, for example, as 108-1 to 108-$n$. For example, a first page of the plurality of pages 108 may be designated as 108-1, a second page of the plurality of pages 108 may be designated as 108-2, etc.

The first page 108-1 of the application 110 may be designated as a startup page for the application 110. Further, the first page 108-1 may represent a page for which a flow of data between the plurality of pages 108 including the first page 108-1, the second page 108-2, and at least one further page is traceable from the first page 108-2 to each of the plurality of pages 108.

In order to partition the code for the application 110, a parenting information determination module 116 is to determine parenting information 118 that identifies the plurality of pages 108 of the application 110 to determine relationships 120 between different pages of the application 110. According to an example, the parenting information determination module 116 may determine the parenting information 118 based on each control of a plurality of controls included in the application 110 and each rule of a plurality of rules included in the application 110. Thus, the parenting information 118 may identify which page of the plurality of pages 108 is associated with a respective control of the plurality of controls, and/or a respective rule of the plurality of rules.

With respect to the relationships 120, a relationship between two pages may be designated in accordance with the page numbers (e.g., 120-1-2 designates a relationship between page 108-1 and page 108-2, 120-2-3 designates a relationship between page 108-2 and page 108-3, etc.).

According to an example, the relationships 120 between different pages of the application 110 may include entry points 122 and/or the dependencies 106. With respect to the entry points 122, an entry point between two pages may be designated in accordance with the page numbers (e.g., 122-1-2 designates an entry point from page 108-1 to page 108-2, 122-2-3 designates an entry point from page 108-2 to page 108-3, etc.). With respect to the dependencies 106, a dependency between two pages may be designated in accordance with the page numbers (e.g., 106-1-2 designates dependency of page 108-1 on page 108-2, 106-2-3 designates a dependency of page 108-2 on page 108-3, etc.).

A code file generation module 124 is to generate the plurality of code files 114, where each code file of the plurality of code files 114 corresponds to a page of the plurality of pages 108. Each code file of the plurality of code files 114 of the application 110 may be designated, for example, as 114-1 to 114-$n$. For example, a first code file of the plurality of code files 114 may be designated as 114-1, a second code file of the plurality of code files 114 may be designated as 114-2, etc. The first code file 114-1 may correspond to the first page 108-1, the second code file 114-2 may correspond to the second page 108-2, etc. The first code file 114-1 of the application 110 may be designated as a startup code file for the application 110.

A code file identification module 126 is to identify at least one code file of the plurality of code files 114 to control startup of the application 110. For example, assuming that the first code file 114-1 includes code to load the second code file 114-2 (or an $n^{th}$ code file) in response to the first code file 114-1 being loaded and executed, the code file identification module 126 may identify the first code file 114-1 and the second code file 114-2 (or the $n^{th}$ code file) to control startup of the application 110. In this regard, the $n^{th}$ code file may cause other code files to be loaded and executed.

A code file loading module 128 is to load the at least one code file identified from the plurality of code files 114. For example, assuming that the code file identification module 126 identifies the first code file 114-1 and the second code file 114-2 to control startup of the application 110, the code file loading module 128 may load the first code file 114-1 and the second code file 114-2 from the plurality of code files 114. The code files 114 for the application 110 may be stored in memory (e.g., memory 504 of FIG. 5 or non-transitory computer readable medium 702 of FIG. 7). The code files 114 may be accessed when an associated page is needed, and may otherwise remain stored in memory.

A code file execution module 130 is to execute the at least one code file identified from the plurality of code files 114. For example, assuming that the code file identification module 126 identifies the first code file 114-1 and the second code file 114-2 to control startup of the application 110, the code file execution module 130 may execute the first code file 114-1 and the second code file 114-2 from the plurality of code files 114.

Operation of the apparatus 100 is described in further detail with reference to FIG. 1.

Referring to FIG. 1, according to an example, the parenting information determination module 116 may determine the parenting information 118 to determine a relationship between the first page 108-1 and the second page 108-2 of the application 110. In this regard, the code file generation module 124 may generate the first code file 114-1 for the first page 108-1 based upon the determined relationship between the first page 108-1 and the second page 108-2. The code file generation module 124 may further generate the second code file 114-2 for the second page 108-2. The first code file 114-1 may include code to load the second code file 114-2 in response to the first code file 114-1 being loaded and executed. In this regard, the code file generation module 124 may generate the first and second code files 114-1 and 114-2, respectively, to cause loading and execution of the first and second code files 114-1 and 114-2, respectively, without causing another code file for another page that is not determined to have a relationship with the first page 108-1 or the second page 108-2 to be loaded. Further, according to an example, the code to load the second code file 114-2 included in the first code file 114-1 may include a navigate command to load the second page 108-2, and a control associated with the code to load the second code file 114-2 is to activate the navigate command.

Referring to FIG. 1, according to another example, the parenting information determination module 116 may determine the parenting information 118 to determine a further relationship between the second page 108-2 and a third page 108-3 of the application 110. In this regard, the code file generation module 124 may generate the second code file 114-2 to include the further relationship between the second page 108-2 and the third page 108-3. Further, the code file generation module 124 may generate a third code file 114-3 for the third page 108-3. In this regard, loading and execution of the second code file 114-2 causes loading and execution of the third code file 114-3.

Referring to FIG. 1, according to another example, the code file generation module 124 may determine, based on the parenting information 118, whether the first page 108-1 includes an association (i.e., a relationship) with the third page 108-3 of the plurality of pages 108. In response to a determination that the first page 108-1 includes an association with the third page 108-3, the code file generation module 124 may generate the first code file 114-1 to include an instruction (i.e., code) to load the third code file 114-3 of the generated code files 114 that corresponds to the third page 108-3. The instruction to load the third code file 114-3 is to cause the third code file 114-3 to be loaded when the first code file 114-1 is loaded and executed. Alternatively, in response to a determination that the first page 108-1 does not include an association with the third page 108-3, the code file generation module 124 may generate the first code file 114-1 to omit an instruction to load the third code file 114-3, where loading and execution of the first code file 114-1 does not result in the third code file 114-3 being loaded with the first code file 114-1.

Referring to FIG. 1, according to another example, assuming that the parenting information determination module 116 determines the association (i.e., the relationship) to include an entry point for the second page 108-2 in the first page 108-1 and/or a dependency of the first page 108-1 on the second page 108-2, the parenting information determination module 116 may determine that the entry point for the second page 108-2 is to be displayed on the first page 108-1 and/or information to be displayed on the second page 108-2 is to be accessed from the second page 108-2 and displayed on the first page 108-1.

Referring to FIG. 1, according to another example, the code file generation module 124 may determine, based on the parenting information 118, whether the second page 108-2 includes an association (i.e., a relationship) with the third page 108-3 of the plurality of pages 108. In this regard, in response to a determination that the second page 108-2 includes an association with the third page 108-3, the code file generation module 124 may generate the second code file 114-2 to include an instruction to load the third code file 114-3 of the generated code files 114 that corresponds to the third page 108-3, where the instruction to load the third code file 114-3 is to cause the third code file 114-3 to be loaded when the second code file 114-2 is loaded and executed. Alternatively, in response to a determination that the second page 108-2 does not include an association with the third page 108-3, the code file generation module 124 may generate the second code file 114-2 to omit an instruction to load the third code file 114-3, where loading and execution of the second code file 114-2 does not result in the third code file 114-3 being loaded with the second code file 114-2.

Figure 3:
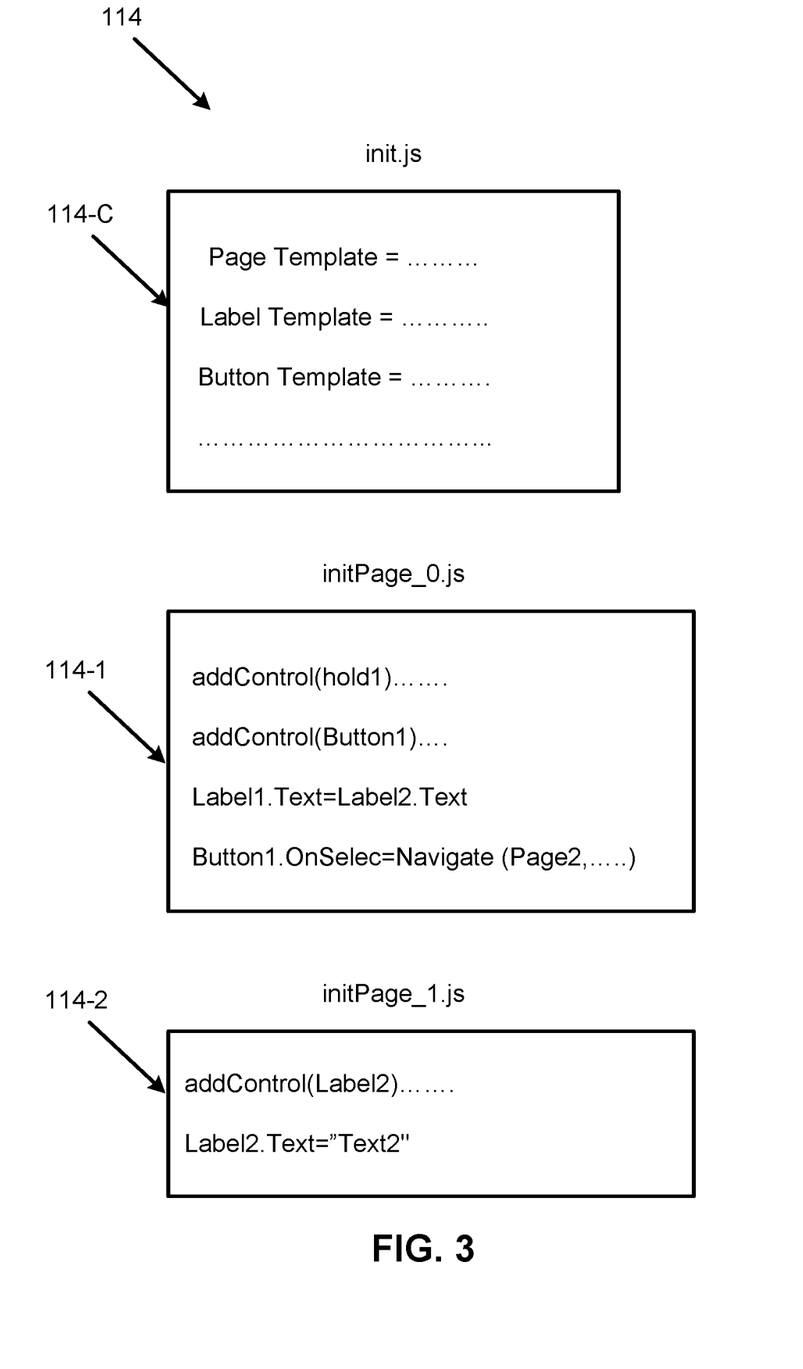
FIG. 3 illustrates example code files for the pages of FIG. 2 to illustrate operation of the application startup control apparatus of FIG. 1 in accordance with an embodiment of the present disclosure.

Referring to FIG. 1, according to another example, the code file generation module 124 may generate a common code file (where the common code file may be designated 114-C as shown in FIG. 3) that includes information for executing code across to the plurality of pages 108 of the application 110. The common code file 114-C and the first code file 114-1 may be loaded and executed to control startup of the application 110.

Figure 2:
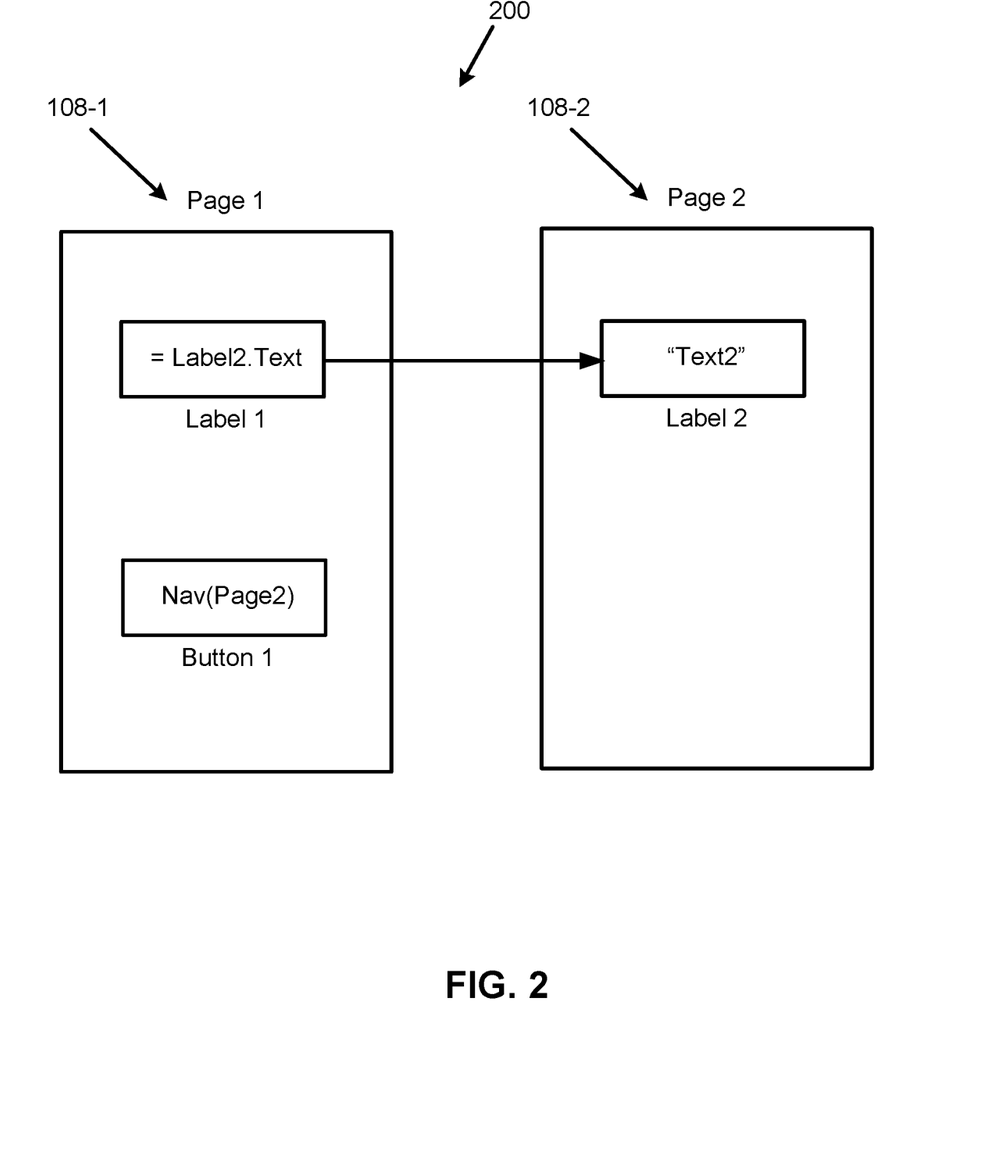
FIG. 2 illustrates a layout of pages to illustrate operation of the application startup control apparatus of FIG. 1 in accordance with an embodiment of the present disclosure.

FIG. 2 illustrates a layout 200 of pages 108 to illustrate operation of the apparatus 100 in accordance with an embodiment of the present disclosure.

Referring to FIGS. 1 and 2, and particularly FIG. 2, the example layout 200 of the pages 108 may include the first page 108-1 (illustrated as Page 1), and the second page 108-2 (illustrated as Page 2). Page 1 may represent the parenting information 118 for the controls Label 1 and Button 1. For Page 1, Label 1 may represent a control for rendering text (e.g., Label2.Text), and Button 1 may represent a control for interacting with the application 110 by clicking or tapping. For the example of FIG. 2, Page 2 may represent the parenting information 118 for the control Label 2. For Page 2, Label 2 may represent a control for rendering text (e.g., Text 2). The parenting information 118 may be analyzed to isolate an individual page's elements during publishing of the pages 108.

FIG. 3 illustrates example code files 114 for the pages of FIG. 2, to illustrate operation of the apparatus 100 in accordance with an embodiment of the present disclosure.

For example, FIG. 3 illustrates the common code file 114-C, a first code file 114-1 corresponding to Page 1, and a second code file 114-2 corresponding to Page 2.

The common code file 114-C may include information for executing code across to the plurality of pages 108 of the application 110. For example, the common code file 114-C may include template details with respect to the pages 108, controls such as labels, buttons, etc. The first code file 114-1 may include elements of Page 1, and the second code file 114-2 may include elements of Page 2.

Referring to FIGS. 2 and 3, for the example of FIG. 2, a rule may indicate that the text property for Label 1 is set to the output of "Label2.text", where "Text2" for Label 2 is present on Page 2. This rule with respect to Label 1 and Label 2 may be described as a dependency rule. Thus, the dependency rule with respect to Label 1 and Label 2 specifies that Page 2 is to be loaded and executed when Page 1 is loaded and executed. Thus, with respect to the dependency "Label1.Text=Label2.Text" of the code file 114-1, Page 1 is dependent on Page 2, and thus Page 2 is to be loaded for correct functionality of the application 110. According to another example, with respect to the dependency "Label1.Text=Label2.Text" of the code file 114-1, Page 1 is dependent on Page 2, and thus a portion of Page 2 (as opposed to the entire Page 2) that is needed by Page 1 may be loaded for correct functionality of the application 110.

As disclosed herein, with respect to determination of the dependencies 106 and generation of the code files 114, declarative documents may provide for application creation through code generation. The generated code may be associated with the data flow graph 112, which represents the logic of the application 110. With respect to the code files 114, during a publish operation, the dependency map generation module 102 may analyze the data flow graph 112 to generate the dependency map 104 between pages 108 to identify the code files 114 that are to be loaded prior to navigation associated with the application 110.

Figure 4:
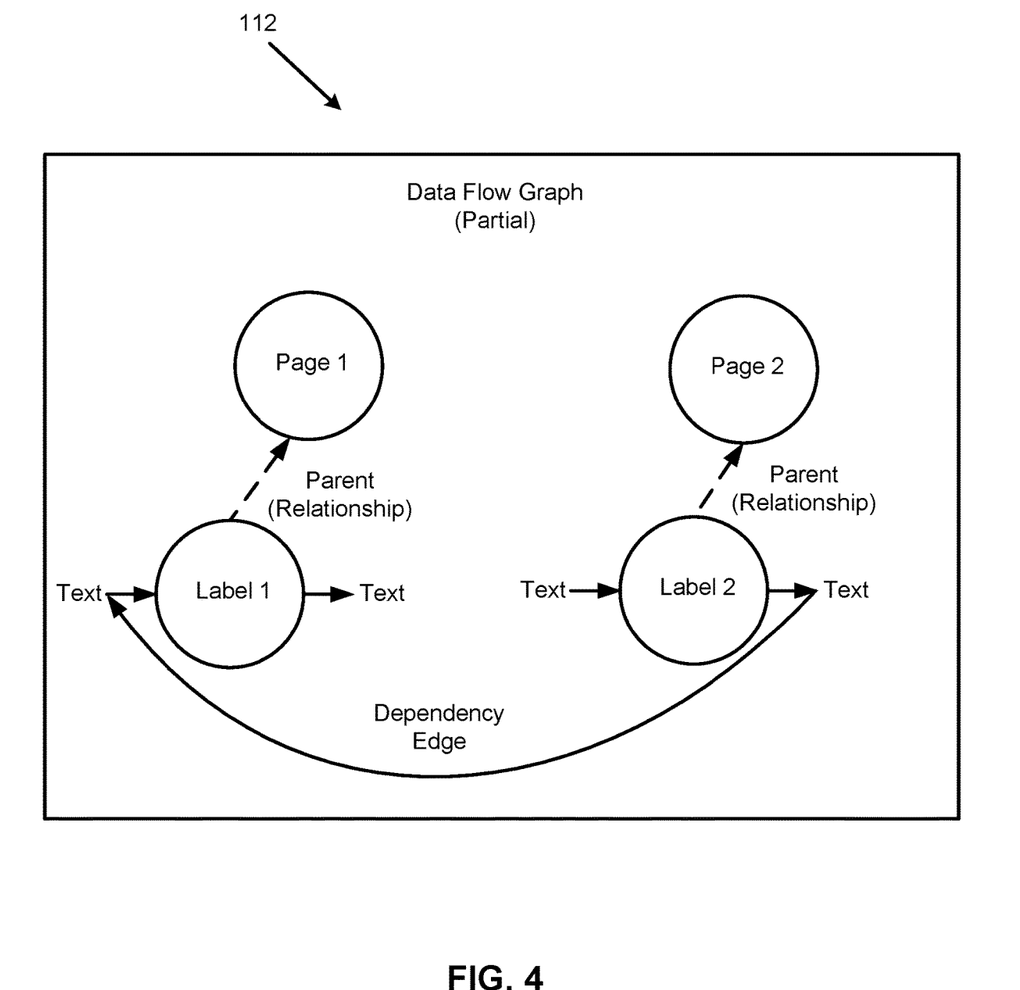
FIG. 4 illustrates an example of a data flow graph to illustrate operation of the application startup control apparatus of FIG. 1 in accordance with an embodiment of the present disclosure.

For the example of FIGS. 2 and 3, FIG. 4 illustrates an example of a partial data flow graph to illustrate operation of the apparatus 100 in accordance with an embodiment of the present disclosure. For the example of FIGS. 2-4, the data flow graph 112 may include an edge between a node for Label1.Text and a node for Label2.Text. In this regard, the data flow graph 112 may include nodes that represent controls and the input and output properties of the controls, and edges between the nodes. For example, for Label 1, Label 1 may be represented by a cluster of nodes in the data flow graph 112. One node of the cluster may represent the Label 1, and other nodes of the cluster may represent input and output properties associated with the Label 1. Input properties may represent receivers of data (e.g., data that comes into a label, for example, new text that is to be rendered). Output properties may represent sources of data with respect to what depends on the label. For the example of FIGS. 2 and 3, Label 2, which is downstream and depends on data from Label 1, the input and output nodes for Label 1 and Label 2 may be connected in the data flow graph 112. By analyzing this information during publishing of the application 110, any cases of cross page dependencies may be identified and recorded. In this manner, when a page is requested for load, dependent pages that are needed may be loaded for proper functionality of the application 110. With respect to loading of dependent pages, for the example of FIGS. 2 and 3, because Page 1 indicates a requirement for Page 2, Page 1 and Page 2 may be loaded sequentially. In this regard, as disclosed herein, the dependency map generation module 102 may analyze the data flow graph 112 to generate the dependency map 104. For the example of FIGS. 2-4, the dependency map 104 may include a row and column format, where a first row may indicate that Page 1 includes dependencies on Page 2, Page 2 includes dependencies on Pages 3 and 4, Page 3 includes dependencies on Page 5, etc.

The rules and controls may be used to determine a cumulative effect on the first page (e.g., Page 1 for the example of FIG. 2). In this regard, Page 1 may represent a page for which a flow of data between the plurality of pages 108 including Page 1, Page 2, and at least one further page is traceable from Page 1 to each of the plurality of pages 108.

Dependencies between different pages 108 of the application 110 may include a complex nesting. For example, a hypothetical flow of data may proceed from Page 15 to Page 30, to Page 40, and eventually the flow of data may be directed to Page 1. These dependencies may be tracked to determine the controls and rules associated with Page 1, the code for which represents the startup code file.

With respect to the entry points 122 of the relationships 120, as disclosed herein, an entry point may be described as an action that provides for navigation from one page to another page that is specified by that entry point. For the example of FIGS. 2 and 3, an entry point may include "Button1.OnSelect=Navigate(Page2)", where selection of "Button1" results in navigation to Page 2.

As disclosed herein, logic related to the instantiation and behavior of a control may be isolated within a code file for each of the pages 108 of the application 110. With respect to Page 1 and Page 2 that include code files initPage_0.js and initPage1.js, the designation "Page_0" may be used for Page 1, and the designation "Page_1" may be used for Page 2. However, other designations such as "Page_1" for Page 1, and "Page_2" for Page 1, etc., may be used.

With respect to the dependencies between different pages 108, by keeping track of the dependencies between different pages 108, potential performance problems from cross page dependencies may be identified. In this regard, a notification may be generated with respect to any performance problems from cross page dependencies. An example of potential performance problems related to cross page dependencies may include an application 110 that includes ten pages 108 (e.g., Page 1 to Page 10), where Page 1 includes ten controls which refer to several elements on all of the other pages, and vice-versa. In such a case, loading of the application 110 includes loading of all ten pages. Such dependencies may affect the performance of the application 110 in that all ten pages need to be loaded. Thus, dependencies may be reduced and eliminated as needed to reduce the load associated with execution of the application 110 (e.g., where Page1 and Page2 are needed to load the application 110, as opposed to all ten pages).

Figure 5:
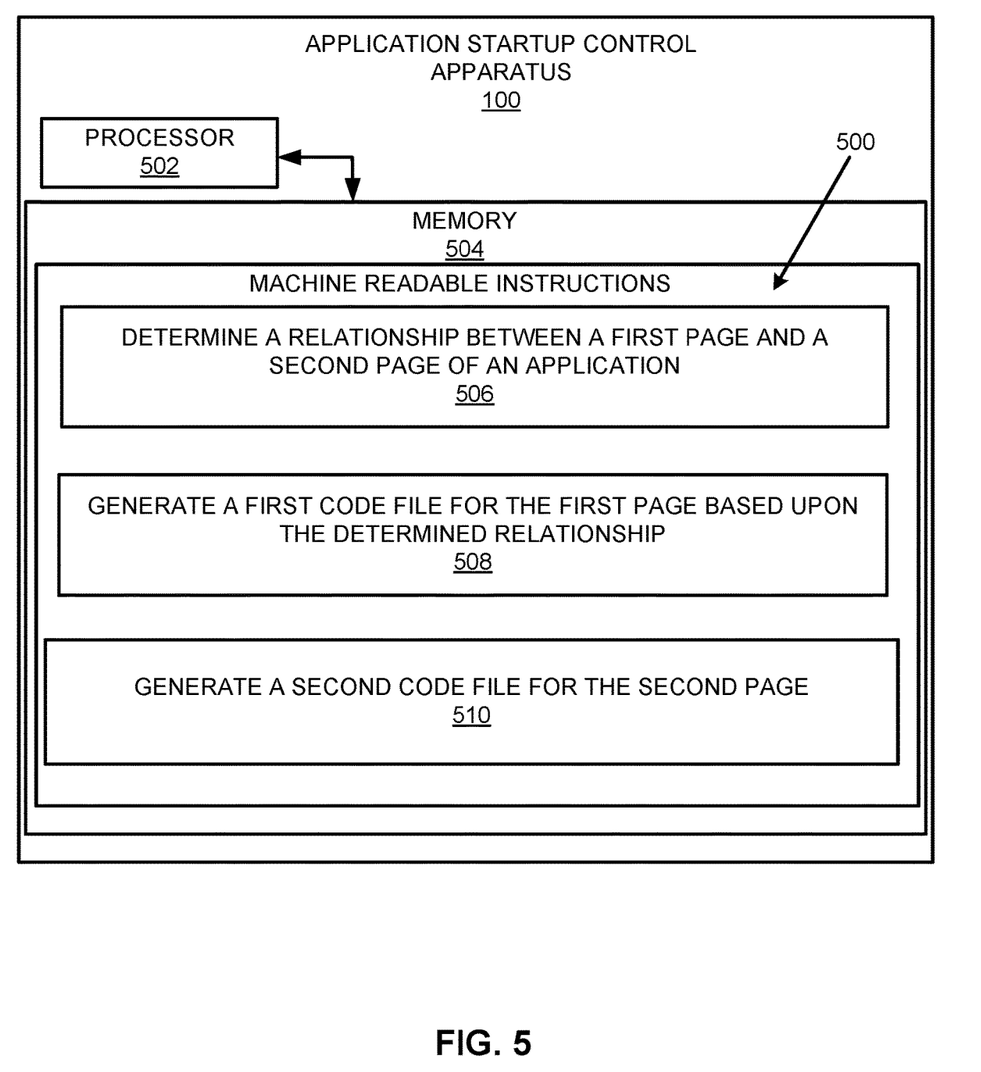
FIG. 5 illustrates a block diagram for application startup control in accordance with an embodiment of the present disclosure.
Figure 6:
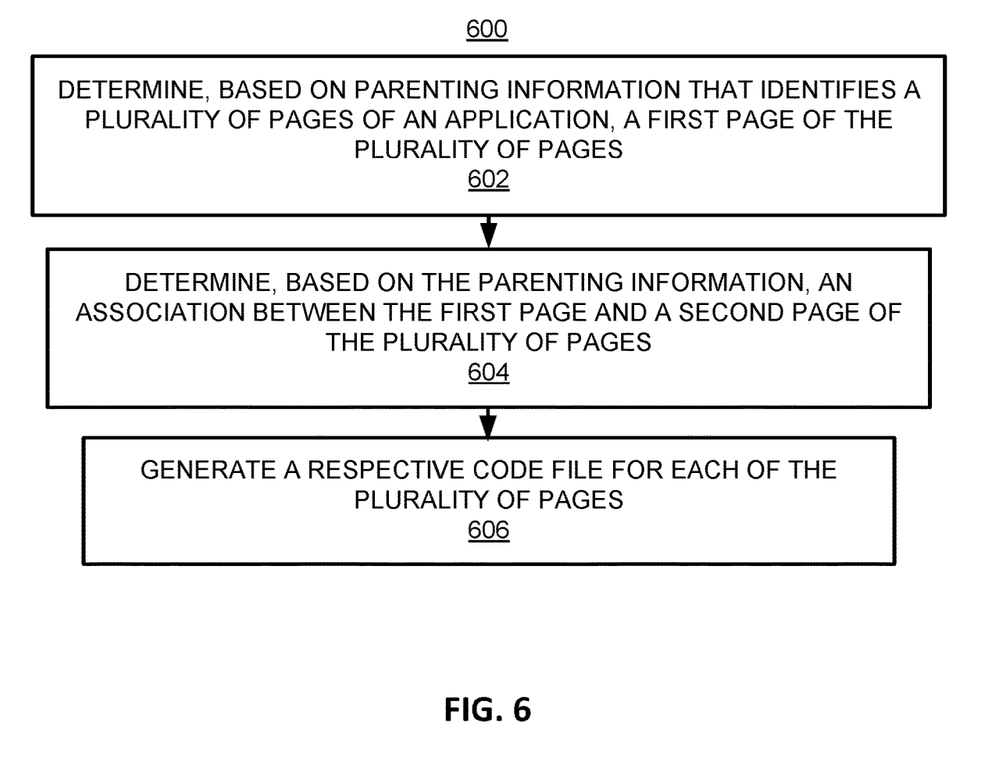
FIG. 6 illustrates a flowchart of a method for application startup control in accordance with an embodiment of the present disclosure.
Figure 7:
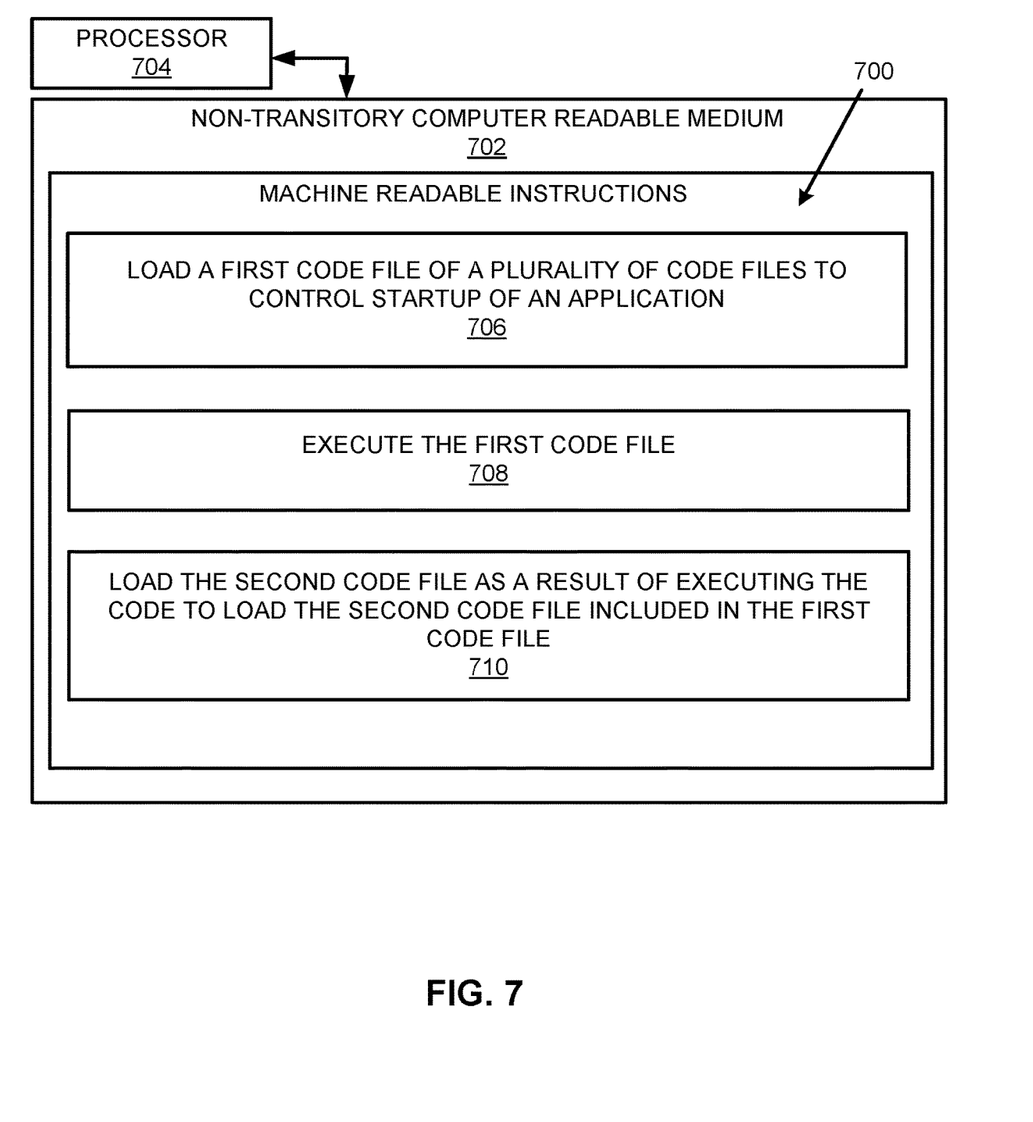
FIG. 7 illustrates a block diagram for application startup control in accordance with another embodiment of the present disclosure.

FIGS. 5-7 respectively illustrate an example block diagram 500, a flowchart of an example method 600, and a further example block diagram 700 for application startup control, according to examples. The block diagram 500, the method 600, and the block diagram 700 may be implemented on the apparatus 100 described above with reference to FIG. 1 by way of example and not of limitation. The block diagram 500, the method 600, and the block diagram 700 may be practiced in other apparatus. In addition to showing the block diagram 500, FIG. 5 shows hardware of the apparatus 100 that may execute the instructions of the block diagram 500. The hardware may include a processor 502, and a memory 504 storing machine readable instructions that when executed by the processor cause the processor to perform the instructions of the block diagram 500. The memory 504 may represent a non-transitory computer readable medium. FIG. 6 may represent an example method for application startup control, and the steps of the method. FIG. 7 may represent a non-transitory computer readable medium 702 having stored thereon machine readable instructions to provide application startup control according to an example. The machine readable instructions, when executed, cause a processor 704 to perform the instructions of the block diagram 700 also shown in FIG. 7.

The processor 502 of FIG. 5 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 702 of FIG. 7), such as hardware storage devices (e.g., RAM (random access memory), ROM (read only memory), EPROM (erasable, programmable ROM), EEPROM (electrically erasable, programmable ROM), hard drives, and flash memory). The memory 504 may include a RAM, where the machine readable instructions and data for a processor may reside during runtime.

Referring to FIGS. 1-5, and particularly to the block diagram 500 shown in FIG. 5, the memory 504 may include instructions 506 to determine (e.g., by the parenting information determination module 116) a relationship between a first page 108-1 and a second page 108-2 of the application 110. For example, as disclosed herein with respect to FIGS. 2 and 3, the memory 504 may include instructions to determine (e.g., by the parenting information determination module 116) a relationship between Page 1 and Page 2 of the application 110. For the example of FIGS. 2 and 3, the relationship may include an entry point that includes "Button1.OnSelect=Navigate(Page2)", where selection of "Button1" results in navigation to Page 2. Further, for the example of FIGS. 2 and 3, the relationship may include a dependency that indicates that the text property for Label 1 is set to the output of "Label2.text", where Page 2 is to be loaded and executed when Page 1 is loaded and executed.

The processor 502 may fetch, decode, and execute the instructions 508 to generate (e.g., by the code file generation module 124) a first code file 114-1 for the first page 108-1 based upon the determined relationship. For example, as disclosed herein with respect to FIGS. 2 and 3, the memory 504 may include instructions to generate (e.g., by the code file generation module 124) a first code file "initPage_0.js" for Page 1 based upon the determined relationship.

The processor 502 may fetch, decode, and execute the instructions 510 to generate (e.g., by the code file generation module 124) a second code file 114-2 for the second page 108-2. The first code file 114-1 may include code to load the second code file 114-2 in response to the first code file 114-1 being loaded and executed. For example, as disclosed herein with respect to FIGS. 2 and 3, the memory 504 may include instructions to generate (e.g., by the code file generation module 124) a second code file "initPage_1.js" for Page 2.

Referring to FIGS. 1-4 and 6, and particularly FIG. 6, for the method 600, at block 602, the method may include determining (e.g., by the code file generation module 124), based on parenting information 118 that identifies a plurality of pages 108 of the application 110, a first page 108-1 of the plurality of pages 108.

At block 604, the method may include determining (e.g., by the code file generation module 124), based on the parenting information 118, an association between the first page 108-1 and a second page 108-2 of the plurality of pages 108.

At block 606, the method may include generating (e.g., by the code file generation module 124) a respective code file for each of the plurality of pages 108. In this regard, a first code file 114-1 of the generated code files may correspond to the first page 108-1 and include an instruction to load a second code file 114-2 of the generated code files which may correspond to the second page 108-2. Further, the first page 108-1 may be designated as a startup page of the application 110 and the instruction in the first code file 114-1 may be specified to cause the second code file 114-2 to be loaded when the first code file 114-1 is loaded and executed.

Referring to FIGS. 1-4 and 7, and particularly FIG. 7, for the block diagram 700, the non-transitory computer readable medium 702 may include instructions 706 to load (e.g., by the code file loading module 128) a first code file 114-1 of a plurality of code files 114 to control startup of the application 110. In this regard, each of the plurality of code files 114 may be separately loadable. The plurality of code files 114 may be generated based at least on relationships (e.g., as determined by the parenting information determination module 116) between a plurality of pages 108 of the application 110. Further, the first code file 114-1 may correspond to a first page 108-1 of the plurality of pages 108 and include a relationship with a second page 108-2 of the plurality of pages 108.

The processor 704 may fetch, decode, and execute the instructions 708 to execute (e.g., by the code file execution module 130) the first code file 114-1. In this regard, the first code file 114-1 may include code to load a second code file 114-2 of the plurality of code files that corresponds to the second page 108-2.

The processor 704 may fetch, decode, and execute the instructions 710 to load (e.g., by the code file loading module 128) the second code file 114-2 as a result of executing the code to load the second code file 114-2 included in the first code file 114-1.

According to an example, the non-transitory computer readable medium 702 may include instructions to load (e.g., by the code file loading module 128) less then all of the plurality of code files during loading of the first code file 114-1 and the second code file 114-2.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a memory storing machine readable instructions that when executed by the processor cause the processor to:
   determine a relationship between a first page and a second page of an application;
   generate a first code file for the first page based upon the determined relationship;
   identify a property of the first page that is dependent on an output of a property of the second page;
   generate a second code file for the second page, wherein the first code file includes code to load the second code file in response to the first code file being loaded and executed; and update the property of the first page based on loading and execution of the second code file to generate the output of the property of the second page.

2. The apparatus according to claim 1, wherein the first code file and the first page respectively represent a startup code file and a startup page for the application.

3. The apparatus according to claim 1, wherein the instructions are further to cause the processor to generate the first and second code files to cause loading and execution of the first and second code files without causing another code file for another page that is not determined to have a relationship with the first page or the second page to be loaded.

4. The apparatus according to claim 1, wherein the instructions are further to cause the processor to:

determine that a further relationship exists between the second page and a third page of the application;

generate the second code file to include the further relationship between the second page and the third page; and generate a third code file for the third page, wherein loading and execution of the second code file causes loading and execution of the third code file.

5. The apparatus according to claim 1, wherein the relationship includes at least one of an entry point for the second page in the first page or a dependency of the first page on the second page.

6. The apparatus according to claim 1, wherein the first page represents a page for which a flow of data between a plurality of pages including the first page, the second page, and at least one further page is traceable from the first page to each of the plurality of pages.

7. The apparatus according to claim 1, wherein the instructions are further to cause the processor to:

access parenting information that identifies a plurality of pages of the application to determine the relationship between the first page and the second page of the application.

8. The apparatus according to claim 1, wherein the instructions to update the property of the first page based on loading and execution of the second code file to generate the output of the property of the second page are further to cause the processor to:

update the property of the first page based on loading and execution of the second code file to load a portion of the second page.

9. The apparatus according to claim 1, wherein the instructions are further to cause the processor to:

generate, based on a data flow graph, a dependency map that includes relationships between pages of the application, wherein the data flow graph includes nodes that represent controls, input and output properties of the controls, and edges between the nodes; and determine, based on the dependency map, the relationship between the first page and the second page of the application.

10. A method comprising:

determining, by a processor and based on parenting information that identifies a plurality of pages of an application, a first page of the plurality of pages;

determining, based on the parenting information, an association between the first page and a second page of the plurality of pages; and generating a respective code file for each of the plurality of pages, wherein a first code file of the generated code files corresponds to the first page and includes an instruction to load a second code file of the generated code files that corresponds to the second page, wherein the first page is a startup page of the application and the instruction in the first code file is to cause the second code file to be loaded when the first code file is loaded and executed, and wherein a property of the first page that is dependent on an output of a property of the second page is updated based on loading and execution of the second code file to generate the output of the property of the second page.

11. The method according to claim 10, further comprising:

determining, based on the parenting information, whether the first page includes an association with a third page of the plurality of pages; and in response to a determination that the first page includes an association with the third page, generating the first code file to include an instruction to load a third code file of the generated code files that corresponds to the third page, wherein the instruction to load the third code file is to cause the third code file to be loaded when the first code file is loaded and executed.

12. The method according to claim 11, further comprising:

in response to a determination that the first page does not include an association with the third page, generating the first code file to omit an instruction to load the third code file, wherein loading and execution of the first code file does not result in the third code file being loaded with the first code file.

13. The method according to claim 10, wherein the association includes at least one of an entry point for the second page in the first page or a dependency of the first page on the second page, and wherein determining the association between the first page and the second page further comprises:

determining that the at least one of the entry point for the second page is to be displayed on the first page and information to be displayed on the second page is to be accessed from the second page and displayed on the first page.

14. The method according to claim 10, further comprising:

determining, based on the parenting information, whether the second page includes an association with a third page of the plurality of pages; and in response to a determination that the second page includes an association with the third page, generating the second code file to include an instruction to load a third code file of the generated code files that corresponds to the third page, wherein the instruction to load the third code file is to cause the third code file to be loaded when the second code file is loaded and executed.

15. The method according to claim 14, further comprising:

in response to a determination that the second page does not include an association with the third page, generating the second code file to omit an instruction to load the third code file, wherein loading and execution of the second code file does not result in the third code file being loaded with the second code file.

16. The method according to claim 10, further comprising:

determining the parenting information for each control of a plurality of controls included in the application and each rule of a plurality of rules included in the application, wherein the parenting information identifies which page of the plurality of pages is associated with at least one of a respective control of the plurality of controls, or a respective rule of the plurality of rules.

17. The method according to claim 10, further comprising:
generating a common code file that includes information for executing code across the plurality of pages of the application, wherein the common code file and the first code file are to be loaded and executed to control startup of the application.

18. The method according to claim 10, wherein
the instruction to load the second code file included in the first code file includes a navigate command to load the second page, and
a control associated with the instruction to load the second code file is to activate the navigate command.

19. A non-transitory computer readable medium having stored thereon machine readable instructions to provide application startup control, the machine readable instructions, when executed by a processor, cause the processor to:
load a first code file of a plurality of code files to control startup of an application, wherein each of the plurality of code files is separately loadable, wherein the plurality of code files are generated based at least on relationships between a plurality of pages of an application, wherein the first code file corresponds to a first page of the plurality of pages and includes a relationship with a second page of the plurality of pages, and wherein the first page includes a property that is dependent on an output of a property of the second page;
execute the first code file, wherein the first code file includes code to load, in response to the first code file being loaded and executed, a second code file of the plurality of code files that corresponds to the second page;
load the second code file as a result of executing the code to load the second code file included in the first code file; and
update the property of the first page based on loading and execution of the second code file to generate the output of the property of the second page.

20. The non-transitory computer readable medium according to claim 19, wherein the instructions are further to cause the processor to:
load a common code file with the first code file, wherein the common code file includes information for executing code across the plurality of pages of the application.

* * * * *